US012681168B2

(12) United States Patent
Green et al.

(10) Patent No.: US 12,681,168 B2
(45) Date of Patent: Jul. 14, 2026

(54) METHOD OF GENERATING A MAP BASED ON GROUND PENETRATING RADAR SCANS

(71) Applicant: Geophysical Survey Systems, Inc., Nashua, NH (US)

(72) Inventors: Christopher Green, Hollis, NH (US); Rafiou Oketokoun, Melrose, MA (US); David Cist, Winchester, MA (US)

(73) Assignee: Geophysical Survey Systems, Inc., Nashua, NH (US)

( * ) Notice: Subject to any disclaimer, the term of this patent is extended or adjusted under 35 U.S.C. 154(b) by 697 days.

(21) Appl. No.: 17/879,990

(22) Filed: Aug. 3, 2022

(65) Prior Publication Data

US 2024/0045054 A1 Feb. 8, 2024

(51) Int. Cl.
| | |
|---|---|
| *G01S 13/88* | (2006.01) |
| *G01C 21/00* | (2006.01) |
| *G01S 13/89* | (2006.01) |
| *G01V 3/12* | (2006.01) |

(52) U.S. Cl.
CPC ................................... G01S 13/885 (2013.01)

(58) Field of Classification Search
CPC ........ G01S 13/885; G01S 13/86; G01S 13/89; G01S 7/411; G01S 13/87; G01S 13/872; G01S 13/951; G01S 13/862; G01S 13/865; G01S 13/867; G01S 2013/9327; G01S 13/931; G01S 13/855; G01S 13/88; B60W 40/06; B60W 2552/00; B60W 2420/408; B60W 2422/00; B60W 40/064; B60W 40/068; B60W 60/001; G01C 21/26;

(Continued)

(56) References Cited

U.S. PATENT DOCUMENTS

| | | | |
|---|---|---|---|
| 2016/0097879 A1* | 4/2016 | Stolarczyk | G01S 13/89 |
| | | | 342/22 |
| 2018/0217251 A1* | 8/2018 | Stanley | G01S 13/885 |
| 2018/0224540 A1* | 8/2018 | Stanley | G01S 13/885 |

(Continued)

OTHER PUBLICATIONS

Kositsky, Joel, and Peyman Milanfar. "Forward-Looking High-Resolution GPR System." Proceedings of SPIE. vol. 3710. SPIE, 1999. 1052-1062. Web. (Year: 1999).*

(Continued)

*Primary Examiner* — Resha Desai
*Assistant Examiner* — Remash R Guyah
(74) *Attorney, Agent, or Firm* — Michael J. Feigin, Esq.; Feigin and Fridman LLC

(57) ABSTRACT

Disclosed herein is a method of generating a map based on ground penetrating radar (GPR) scans including receiving GPR data corresponding to multiple path of travel of one or a plurality of moving devices and/or surfaces. Some of these paths of travel overlap at least some others and some of these paths of travel are independent of one another. Where overlapping is determined, GPR data is combined to form a higher resolution and/or more accurate determination of physical properties of a subsurface. Further, the resolution can increase with each scan of a particular area and the technology can be used in conjunction with a separate positioning system like a GPS and/or replace the separate positioning system when the resolution is sufficiently high for a portion of the surface.

19 Claims, 8 Drawing Sheets

(58) Field of Classification Search
CPC .... G01C 21/3602; G01C 21/00; G01V 11/00;
G01V 3/12; G01V 3/15
USPC ................. 342/22, 175, 176, 5.8, 190, 192;
701/400, 408, 409, 410; 702/5
See application file for complete search history.

(56) References Cited

U.S. PATENT DOCUMENTS

2023/0007871 A1 *   1/2023   Aldawood  ............ G01S 13/885
2023/0029746 A1 *   2/2023   Raufi  ....................... G01V 3/12

OTHER PUBLICATIONS

Baikovitz, Alexander et al. "Ground Encoding: Learned Factor Graph-Based Models for Localizing Ground Penetrating Radar" Proceedings of the . . . IEEE/RSJ International Conference on Intelligent Robots and Systems. IEEE, 2021. 5476-5483. Web. (Year: 2021).*

* cited by examiner

130

125

120

METHOD OF GENERATING A MAP BASED ON GROUND PENETRATING RADAR SCANS

FIELD OF THE DISCLOSED TECHNOLOGY

The disclosed technology relates generally to a method of generating a map based on ground penetrating radar (GPR) scans, and more specifically, to improve the resolution of a map using ground penetrating radar data and location data of a path of travel of a device across a surface.

BACKGROUND OF THE DISCLOSED TECHNOLOGY

Ground penetrating radar (GPR) is used to generate profiles and cross-sectional diagrams, or maps, of subsurface objects. In order to generate the maps, GPR scanners/antennas, or transducers, scan beneath the surface while transmitting pulses of ultra-high frequency radio waves. The transmitted radio waves are reflected from objects buried in the earth or distinct interfaces between different earth materials. The antenna then receives the reflected, or backscattered, waves and stores them in a digital control unit. The control unit registers the two-way travel time and then amplifies the signals. The output signal voltage peaks are then recorded by a digital control unit.

SUMMARY OF THE DISCLOSED TECHNOLOGY

GPR scans of a subsurface are performed by one or multiple antennas along a surface path and a resultant map or data per coordinate on a surface (which is within the term "map" for purposes of this disclosure and claim interpretation unless otherwise specified) is recorded in memory. Where a particular coordinate or coordinates has less data available, such as from a smaller number of scans over the area, a resolution or number of pixels per area or coordinate is relatively sparse compared to those areas which have been scanned multiple times. With multiple scans, the data per coordinate is increased and refined such that the resolution becomes higher and/or the coordinate area is more definite and exacting (e.g. more coordinate points per unit area which is a higher resolution).

In some embodiments more than one antenna is used to scan a surface and data is recorded jointly or severally from each antenna to form the map. When antennas and GPR measurements over a particular area overlap and/or are adjacent to each other and/or cross paths, the recorded respective maps can be joined together into a larger map where the overlap, adjacency, or commonality of paths even if the scans are each in different directions, e.g. 30 degrees or more difference in travel direction.

Disclosed herein is a method of generating a map based on GPR scans including the steps of: a) receiving GPR data corresponding to a path of travel of a device across a surface b) receiving location data corresponding to the path of travel of the device across the surface; c) generating a first resolution map based on steps a) and b); and d) iteratively carrying out steps a) and b) and updating the first resolution map based on additional GPR data and location data received after iteratively carrying out steps a) and b).

In some embodiments, at least some of the location data received in step b) is from separate positioning systems.

In some embodiments, when the location data and the GPR data correspond to each other above a pre-defined threshold value for different iterations of carrying out steps a) and b), the first lower resolution map is updated to a second higher resolution at locations where the location data and the GPR data correspond to each other.

In embodiments, when the first resolution map is updated to the second higher resolution, the path of travel of each iteration of carrying out steps a) and b) are non-identical but overlap at least in part.

In some embodiments, at least some of the paths of travel of each iteration of carrying out both steps a) and b) are in different directions with respect to one another, such that the paths of travel of each iteration are offset from one another, e.g. 30 degrees offset from one another. In embodiments, the first resolution map is updated to a second higher resolution where the different direction of the paths of travel overlap.

In embodiments, the separate positioning system data is unused for at least a portion of the travel from one location to another location due to the ability to place the GPR data more accurately than the separate positioning system data.

In some embodiment, the first and subsequent resolution maps are a rendered and human viewable three-dimensional map of a surface and the features beneath the surface.

In other embodiments, the first and subsequent resolution maps are a series of dielectric values for each resolved position of a plurality of resolved positions within the first resolution map.

In certain embodiments, a confidence level of an accuracy of the plurality of resolved positions increases with each subsequent pass over each of the plurality of resolved positions. When the confidence level is above a pre-defined tolerance level, GPR data becomes the primary source for determining position.

In some embodiments, iterations of carrying out steps a) and b) may be carried out by different GPR antennas.

In some embodiments, a multiplicity of GPR sensor types are used for steps a) and b). These steps can be taken using GPR sensors of different architecture, size, weight, frequency and/or from varying distances, angles, speeds or orientations from the surface.

In some embodiments, the GPR sensor is stationary and the surface is moving under it. This surface can move in any arbitrary direction, speed, angle or orientation with respect to the GPR sensor. The same steps a) and b) can be carried out by moving the surface iteratively, rather than the GPR sensor.

In other embodiments, each of the different ground penetrating radar antennas, travels in a different direction than each of the previous ground penetrating radar antennas such that only some paths of the different ground penetrating radar antennas overlap. In embodiments, the overlapping paths are required to update a previously stored portion of the first resolution map and/or increase a resolution of the previously stored portion of the first resolution map.

In some embodiments, step d) includes resolving the first resolution map into a second and subsequently higher resolution when there is sufficient location correspondence between a received response of a subsequent GPR transmission of the additional GPR data and location data and a previous received response for any location data.

In embodiments, at least some of the paths of travel of each iteration of carrying out steps a) and b) are in arbitrary directions relative to one another, and the first resolution map is updated to a second higher resolution where the arbitrary directions of the paths of travel overlap. It is understood that the GPR antenna polarizations from each direction (i.e at each angle) may be considered to improve the accurate placement of the data into the higher resolution map.

In some embodiments, the first resolution map is a series of determined electromagnetic propagation velocity values for each resolved position of a plurality of resolved positions within the first resolution map.

In embodiments, each iteration of carrying out steps a) and b) causes a reduced pixelation of and an increased resolution of at least some of the first resolution map.

For purposes of this disclosure, the following definitions are used. "ground penetrating radar" or "GPR" is defined as "a geophysical method that uses radar pulses to image the subsurface. More specifically, GPR uses electromagnetic radiation in the microwave band (UHF/VHF frequencies) of the radio spectrum, and detects reflected signals from subsurface structures." "Subsurface" is defined as "a region behind the surface such as an underground region behind the ground surface, or a region behind a surface of a structure, such as a region inside and/or behind a wall or ceiling structure." "Map" is defined as "a visual or mathematical representation beneath a surface correlated to positions on the surface." "Mapping" is defined as "determining values which are correlated with a position on the Earth." "Iterative" is defined as "utilizing the repetition of a sequence of steps, methods, operations or procedures where each 'iteration' acquires at least some further data compared to previous such 'iterations'."

"Resolution" is defined as a measure of the sharpness of an image, diagram, amount of mathematically known or discovered values per a unit area" (e.g a number of points known or believed to be known per square decimeter). "Pixelation" is defined as "a size of individual pixels per unit area" and is substantially an inverse of "resolution" for purposes of this disclosure. "Antenna" is defined as "a device for radiating or receiving radio waves." "Scanner" is defined as "a device for sensing record data and/or a radio receiver that sequentially scans a range of frequencies for a signal." "Electromagnetic propagation velocity" also known as "the velocity factor (VF)" and "wave propagation speed" or "velocity of propagation" is defined as in terms of a transmission medium "the ratio of the speed at which a wavefront (of an electromagnetic signal, a radio signal, a light pulse in an optical fibre or a change of the electrical voltage on a copper wire) passes through the medium, to the speed of light in a vacuum." "Dielectric value" or "dielectric constant values" is defined as "a number relating the ability of a material to carry alternating current to the ability of vacuum to carry alternating current." "Transceiver" is "a combination transmitter and receiver device, apparatus, or system for communication therebetween." "Transducer" is defined as "a device that converts variations in a physical quantity, such as electromagnetic energy, pressure, or brightness, into an electrical signal, or vice versa." "Constructive interference" is defined as "the interference of two or more waves of equal frequency and phase, resulting in their mutual reinforcement, thereby producing a single amplitude equal to the sum of the amplitudes of the individual waves." "Update" is defined as "providing an up-to-date version, account, report of data, output or information based on new obtained or received data, input, or information."

Any device or step to a method described in this disclosure can comprise or consist of that which it is a part of, or the parts which make up the device or step. The term "and/or" is inclusive of the items which it joins linguistically and each item by itself. "Substantially" is defined as at least 95% of the term being described and/or "within a tolerance level known in the art and/or within 5% thereof. Any device or aspect of a device or method described herein can be read as "comprising" or "consisting" thereof. When the term "or" is used, it creates a group which has within either term being connected by the conjunction as well as both terms being connected by the conjunction.

DETAILED DESCRIPTION OF EMBODIMENTS OF THE DISCLOSED TECHNOLOGY

Disclosed herein is a method of generating a map based on ground penetrating radar (GPR) scans including receiving GPR data corresponding to multiple path of travel of one or a plurality of moving devices. Some of these paths of travel overlap at least some others and some of these paths of travel are independent of one another. Where overlapping is determined, GPR data is combined to form a higher resolution and/or more accurate determination of physical properties of a subsurface. Further, the resolution can increase with each scan of a particular area and the technology may be used in conjunction with a separate positioning device (like GPS) and/or replace the separate positioning device when the resolution is sufficiently high for a portion of the surface.

Embodiments of the disclosed technology will become clearer in view of the following description of the drawings.

Figure 1:
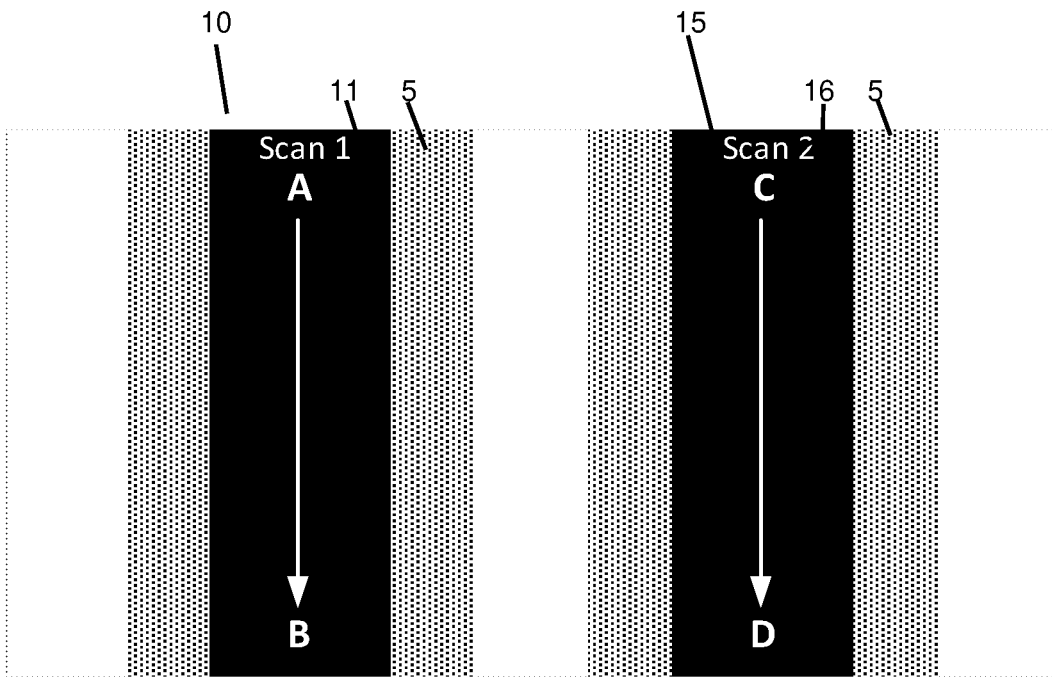
FIG. 1 shows a map generated from two linear, parallel, non-overlapping GPR scans in the same direction, in an embodiment of the present disclosed technology.

FIG. 1 shows a map generated from two linear, parallel, non-overlapping GPR scans in the same direction, in an embodiment of the present disclosed technology. Here, there are two scans, 10 and 15, respectively corresponding to paths a travel from A→B and C→D. These are GPR scans of the surface and subsurface while traveling/moving along the paths, as indicated by the arrows. The scan 10 provides data, such as dielectric values, for a particular location or set of locations along the length and width of the scan path. This can include data about the density of the subsurface at various depths. When, for example, scanning a roadway pipes, rock formations, electric cables, asphalt compaction, and so forth can each produce different GPR response data or dielectrics which are stored for each location.

Likewise, the scan 15 (and all subsequent scans or iterations disclosed herein) provide such data about the surface and/or subsurface scanned. In this case, scan 10 proceeds along path 11 and scan 15 proceeds along a different path 16, in this case, the scan paths 11 and 16 being non-overlapping. While shown as parallel, the scan paths 11 and 16 can represent any two different paths which are non-overlapping. Thus, data for two different sub-surface locations along two different linear (or non-linear) paths are obtained. To determine a location of each, separate positioning systems such as GPS (global positioning systems of any kind known in the art which use satellite navigation), dead reckoning, photo recognition of surroundings, and the like can we used in embodiments of the disclosed technology. In some embodiments, the resultant data (such as dielectrics at a resolution of each scan) for scans 10 and 15 are simply unrelatable until a third scan is made which overlaps the two scans. This will be shown and described below in greater detail.

Referring to the figures in general, a lower resolution data area 5 is outside of a higher resolution area. Here, the "lower" and "higher" resolution are relative to one another. The "lower" resolution, in some embodiments, is less reliable and/or accurate and can constitute an area which is outside of being directly underneath an antenna, and thus, constitute a response from a transmission which is more scattered. In some embodiments, adjusting for a tolerance level, a lower resolution can still be used to match a location with that of another scan, whether the location for the other scan is at a lower or higher resolution.

Figure 2:
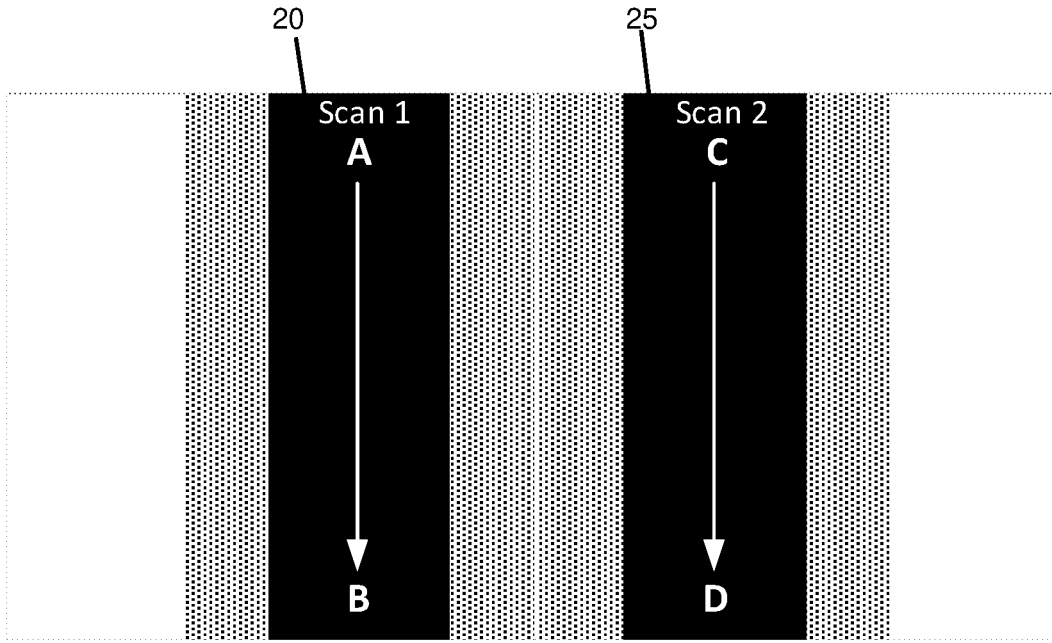
FIG. 2 shows a map generated from two linear, parallel, and adjacent but non-overlapping GPR scans in the same direction, in an embodiment of the present disclosed technology.

FIG. 2 shows a map generated from two linear, parallel, and adjacent but non-overlapping GPR scans in the same direction, in an embodiment of the present disclosed technology. These two scan paths 20 and 25 have different parallel locations. As such, they could be placed together on a map and/or located relative to one another via a separate positioning system such as GPS though they lack overlap.

When a sensor, for example, changes trajectory and crosses from a previously determined dielectric (in this example, from scan 20 to scan 25) then this third passage will allow confirmation of the overlap and/or refine the overlapping area with a greater degree of certainty. Multiple such overlaps, each at different X or XY coordinates (where the scans 20 and 25 proceed in the Y direction) further help connect the two scans 20 and 25 into a larger map/mapped data which are now interconnected and/or part of the same "map" for usage with location determination in the future when it is determined that another iterative path of travel overlaps the existing/now already created map.

Figure 3:
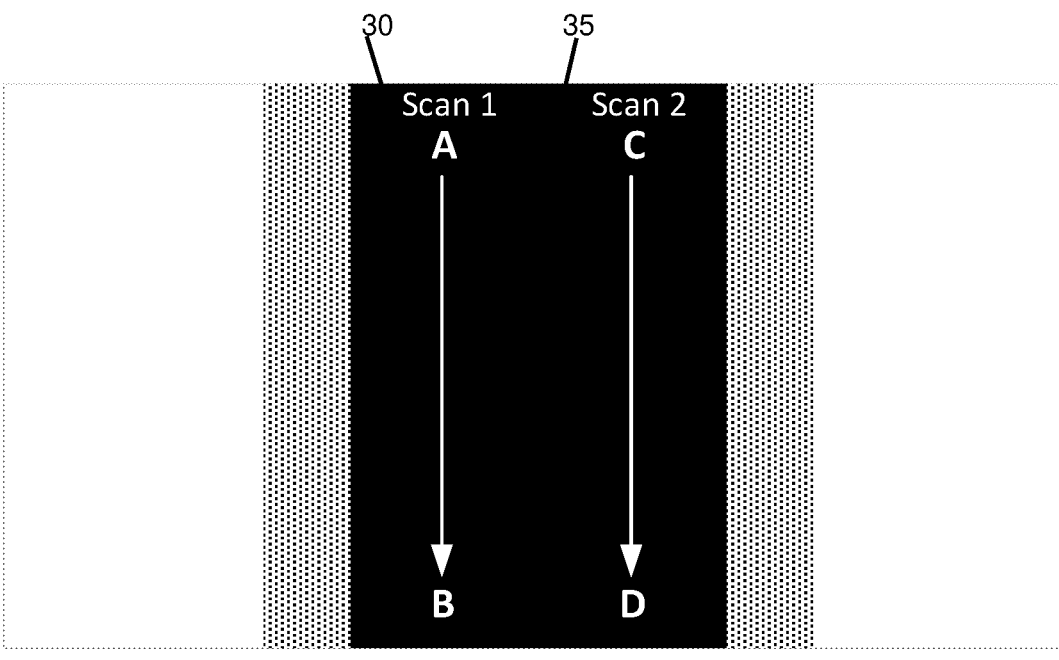
FIG. 3 shows a map generated from two linear, parallel GPR scans in the same direction which begin to overlap, in an embodiment of the present disclosed technology.

FIG. 3 shows a map generated from two linear, parallel GPR scans in the same direction which begin to overlap, in an embodiment of the present disclosed technology. Like what is shown in FIG. 2, the scans here, scans 30 and 35, respectively, are in parallel but are now wide enough and/or close enough that a highest resolution or area of confidence abut each other. Here, as the lower resolution 5 or area of confidence/accuracy do overlap one can place the known data gleaned from each scan 30 and 35 on a same map. This can be stored with less confidence due to the quality of overlap and more subject to change upon receiving further GPR data for the overlapping area and/or conflicting data from GPS or other location determination equipment or devices.

Figure 4:
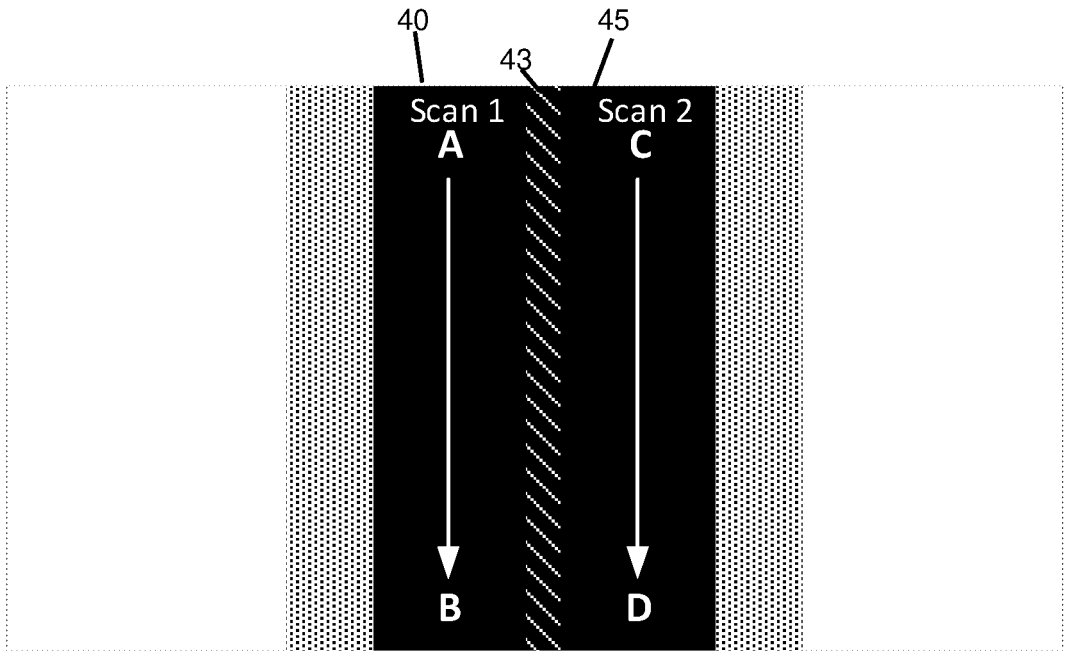
FIG. 4 shows a map generated from two linear, parallel, overlapping GPR scans in the same direction, in an embodiment of the present disclosed technology.

FIG. 4 shows a map generated from two linear, parallel, overlapping GPR scans in the same direction, in an embodiment of the present disclosed technology. Here, the scans 40 and 45 do overlap at their highest resolution overlapping area 43. Thus, with high confidence, one can map the resultant GPR scan data from scans 40 and 45 on the same map to produce a larger area of confidence about the subsurface underneath both scans. At this point, there is enough confidence in the GPR data to help determine position data when a sensor passes over any part of scans 40 and 45. Further, each scan 40 and 45 can provide data at a first resolution where the data is determined to be sufficiently accurate, but where there is overlap and the data matches, a higher resolution can be confirmed with confidence and the map may now have data with the higher confidence level. The higher a confidence level over a particular area (that is, a location bounded by particular X and Y coordinates of any shape or size, regular or irregular) due to more scans resulting in higher resolution, the more the GPR data can be relied on for providing position data at the particular area. In some embodiments, when the GPR data is sufficiently reliable, one can rely on same without the use of separate positioning system data. In some embodiments, the GPR and separate positioning system data are used together to determine a location and once the GPR data becomes sufficiently reliable (has a high enough resolution corresponding to a higher confidence level) then the separate positioning system data is no longer needed.

Figure 5:
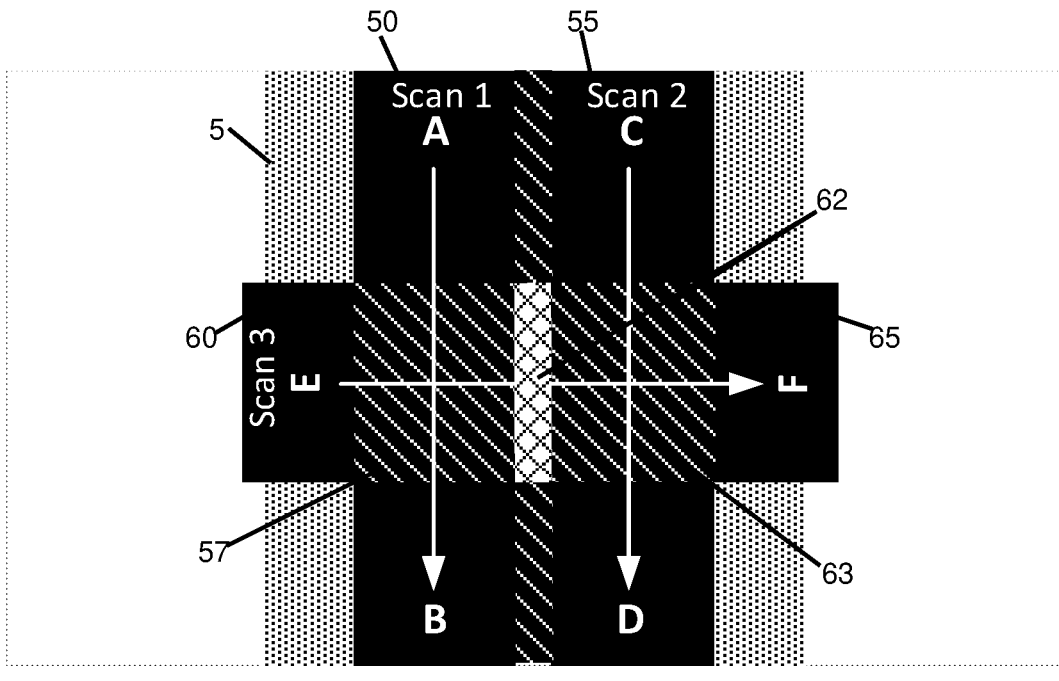
FIG. 5 shows a map generated from three linear GPR scans, two of which are parallel and one of which is perpendicular, all scans overlapping each other, in an embodiment of the present disclosed technology.

FIG. 5 shows a map generated from three linear GPR scans, two of which are parallel and one of which is perpendicular, all scans overlapping each other, in an embodiment of the present disclosed technology. As described with reference to FIGS. 1 and 4, herewith is an example of a scan 60 which crosses the paths of scans 50 and 55. In this embodiment, the scans have different paths, A→B, C→D, and E→F for the respective GPR data sent and received, respectively, for scans 50, 55, and 60. Each scan is a different iteration of carrying out embodiments of the disclosed technology with a first iteration producing a first resolution of data, such as along path A→B with scan 50. A second iteration produces a first resolution of data as well, such as along scan path E→F with scan 60. However, where scan 50 and 60 overlap, as determined by subsurface features/dielectric or like beneath the surface of the area of overlap, a second higher resolution is determined in the area labeled 57 where there is overlap.

When the third scan 55 proceeds along path C→D this scan crosses the scan path of scan 60 and thus a second resolution at an area 63 of commonality between scans 55 and 60 is obtained. Scans 50 and 55 sufficiently overlap so as to be able to generate a larger map with data received from each respective scan as well, in this case. Where all three scans 50, 55, and 60 overlap there are three sets of data allowing a higher yet resolution within area 62. It should be understood that the scans are commutative and additive and can take place in another order.

Figure 6:
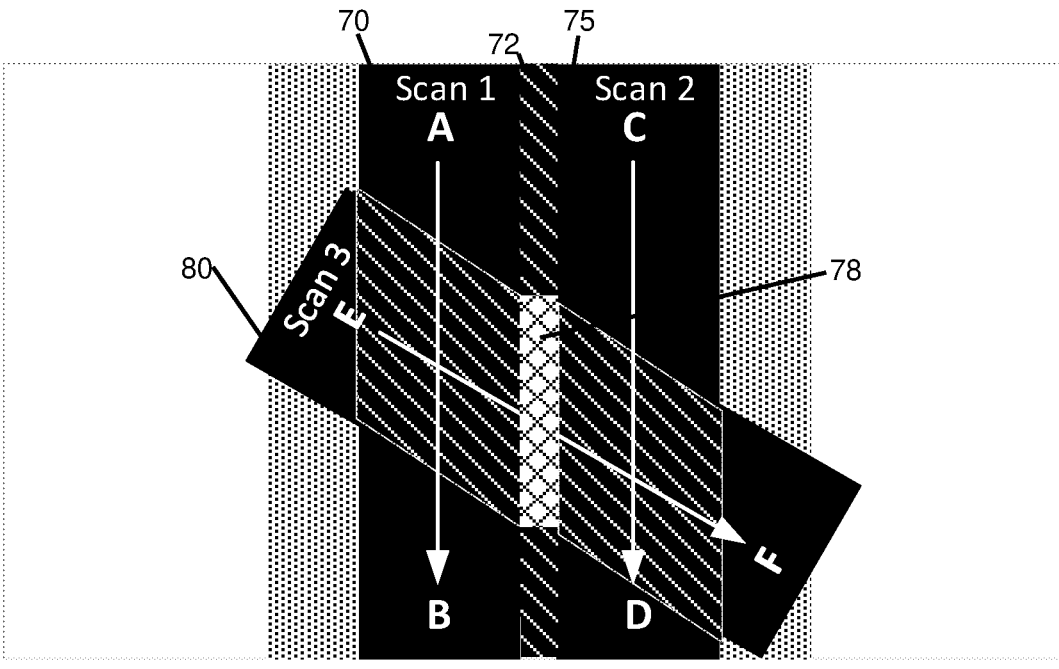
FIG. 6 shows a map generated from three linear GPR scans, two of which are parallel and one of which is in a different direction, all scans overlapping each other, in an embodiment of the present disclosed technology.

FIG. 6 shows a map generated from three linear GPR scans, two of which are parallel and one of which is in a different direction, all scans overlapping each other, in an embodiment of the present disclosed technology. In this version, note that the scans need not be parallel or perpendicular. Any angle scan is covered by the present technology. The overlapping area of scan 70 and 75 at location 72 is as described above. The third scan 80, here, is at an acute angle to the scans 70 and 75. There are double areas of overlap and a triple area of overlap 78 allowing for higher and highest resolutions and decreased and more decreased pixelation (relative to one another).

Figure 7:
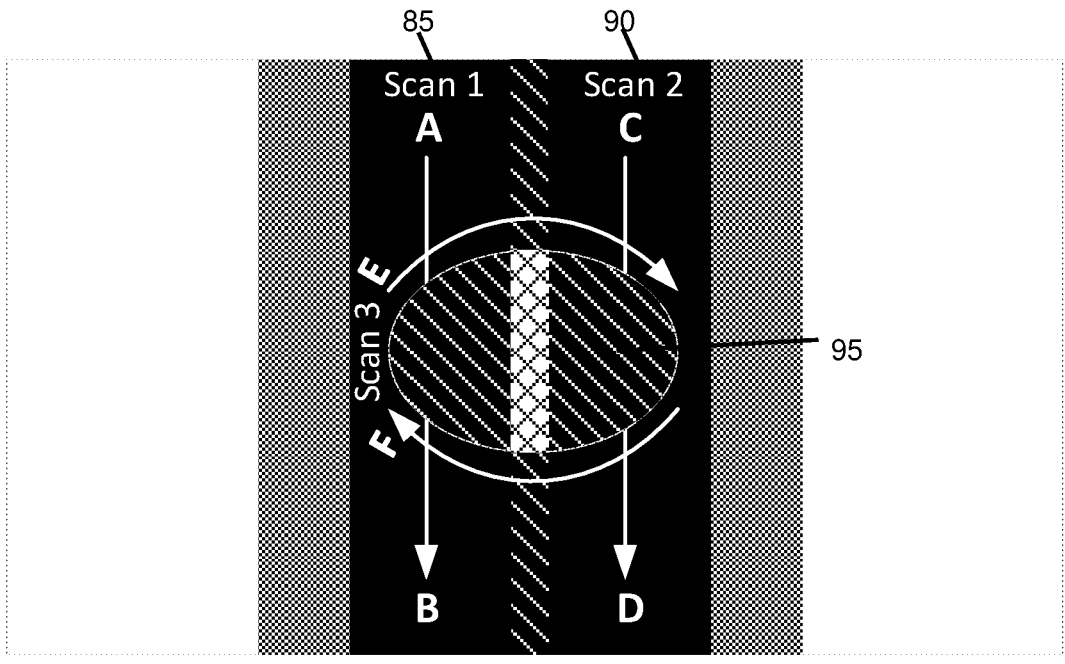
FIG. 7 shows a map generated from two linear overlapping GPR scans and one GPR scan resulting from a circular path of travel, in an embodiment of the present disclosed technology.

FIG. 7 shows a map generated from two linear overlapping GPR scans and one GPR scan resulting from a circular path of travel, in an embodiment of the present disclosed technology. Here, scan paths 85 and 90 are as described above and are partially overlapping. Scan path 95 is circular. The corresponding double and triple overlapping areas are designated by the same single and double cross hatching as in previous figures. This shows that the angle/path of overlap need not be linear or constant. Rather, each scan path results in further knowledge about the subsurface and when combined based on knowledge of direction of travel and location (as determined by any location mechanism, including matching GPR resultant data itself) a higher resolution/ lower pixelation/higher confidence map is created.

Figure 8:
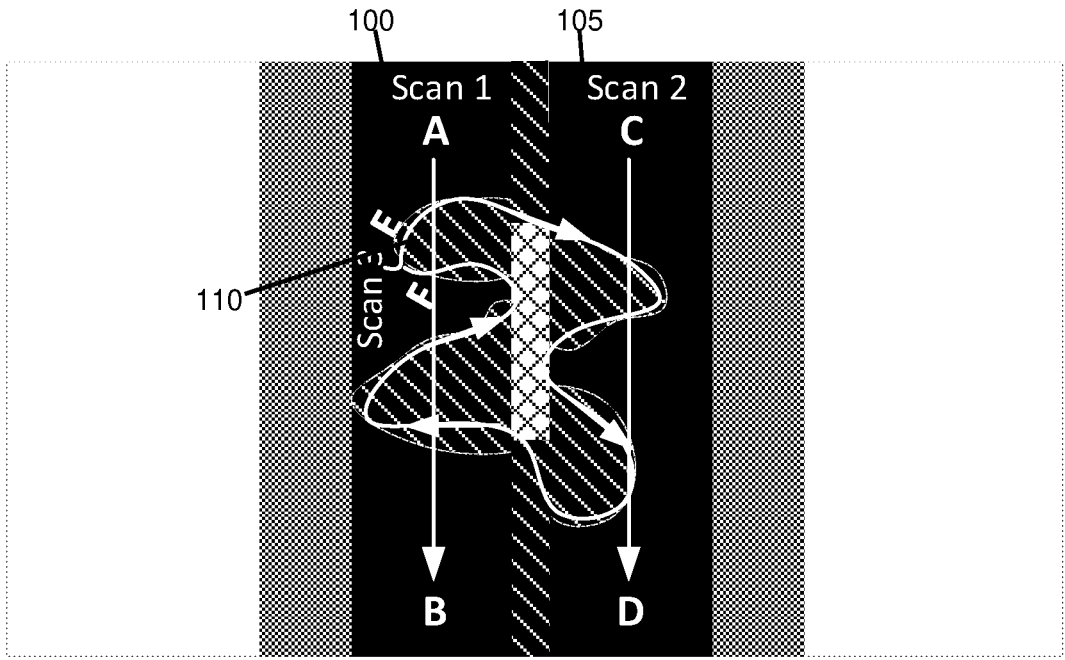
FIG. 8 shows a map generated from two linear overlapping GPR scans and one quasi-randomized direction of travel in a third overlapping GPR scan, in an embodiment of the present disclosed technology.

FIG. 8 shows a map generated from two linear overlapping GPR scans and one quasi-randomized direction of travel in a third overlapping GPR scan, in an embodiment of the present disclosed technology. Here, scan paths 100 and 105 are as described previously and are overlapping. Scan path 110 is haphazard and changes direction in a pseudo-random manner but where overlapping GPR data is received, resolution of the map is further improved. There is no requirement for scan paths to be solely parallel or perpendicular; any arbitrary movement can result in improved map resolution when overlap takes place.

Figure 9:
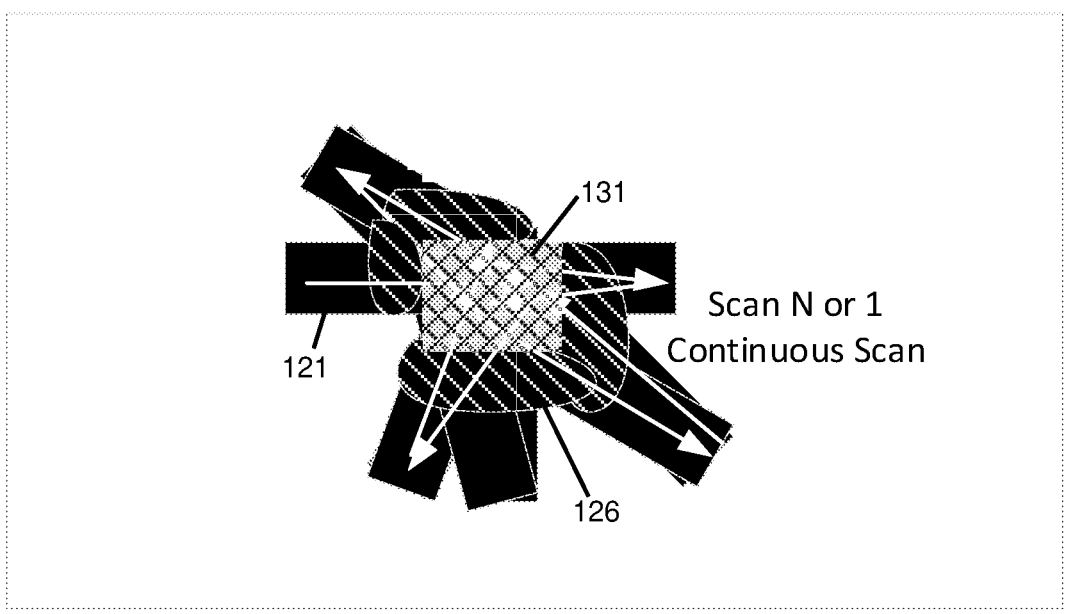
FIG. 9 shows a map generated from a three different GPR scans, each in a different direction, and a resolution determined for a map based on a number of scans per unit area, in an embodiment of the disclosed technology.

FIG. 9 shows a map generated from a three different GPR scans, each in a different direction, and a resolution determined for a map based on a number of scans per unit area, in an embodiment of the disclosed technology. Here, there are any number of n scans, such as scans 121, 126, and 131. The more overlap, the higher the resolution (and/or/being confidence level) for a particular area which has been scanned. As more scans are provided, the area becomes more and more accurate and difference measured values become more apparent.

In some embodiments, different sections of the map may be changing differently over time. For example, near surface features such as pavement dielectric may change, but deeper features such as bedrock may stay the same. In these cases, the deeper features may be used to provide position data and also used to provide reference and/or to highlight the near surface changes.

Figure 10:
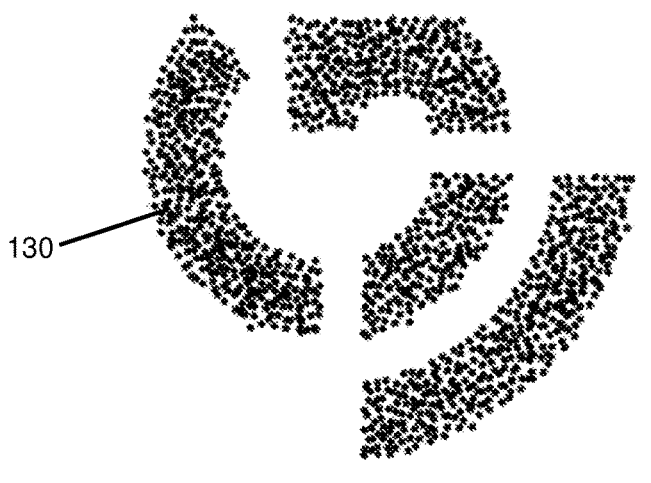
FIG. 10 shows a first resolution map formed by received GPR data and/or location data that has been updated twice to higher resolutions as more scans occur, according to an embodiment of the present disclosed technology.
Figure 10:
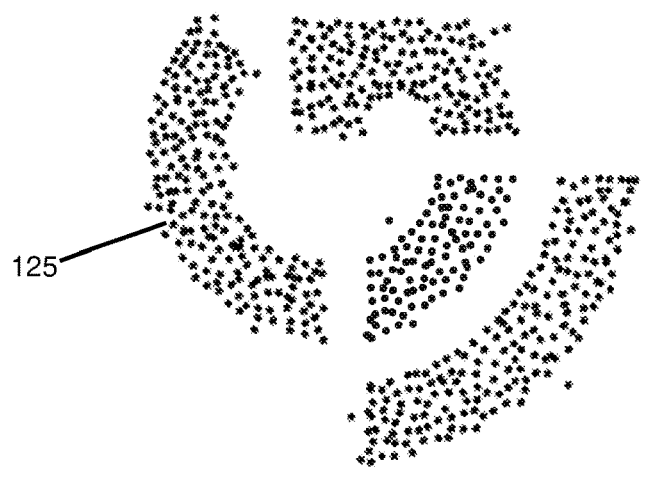
Figure 10:
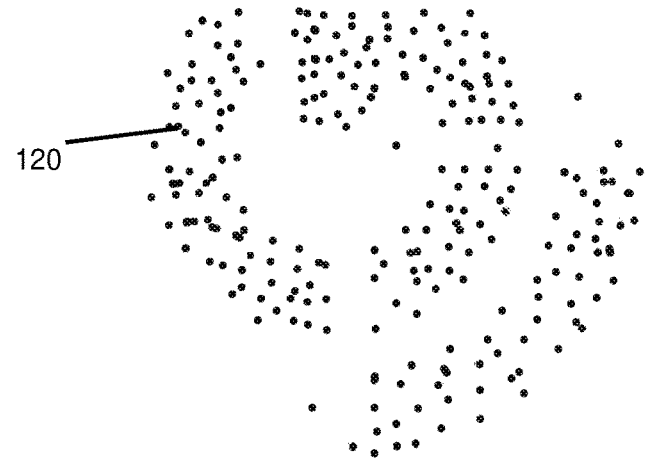

FIG. 10 shows a first resolution map formed by received GPR data and/or location data that has been updated twice to higher resolutions as more scans occur, according to an embodiment of the present disclosed technology. The points shown in each of representative GPR data mapped to a specific location on a surface in depictions 120, 125, and 130 increase as the resolution and confidence level for the area increases with each GPR scan. This can, for example, correspond to the area of overlap of scans 121, 126, and 131 shown in FIG. 9. As each scan 120, 125, and 130 takes place, the area which is shared for the respective scans has increased resolution and decreased pixelation.

Figure 11:
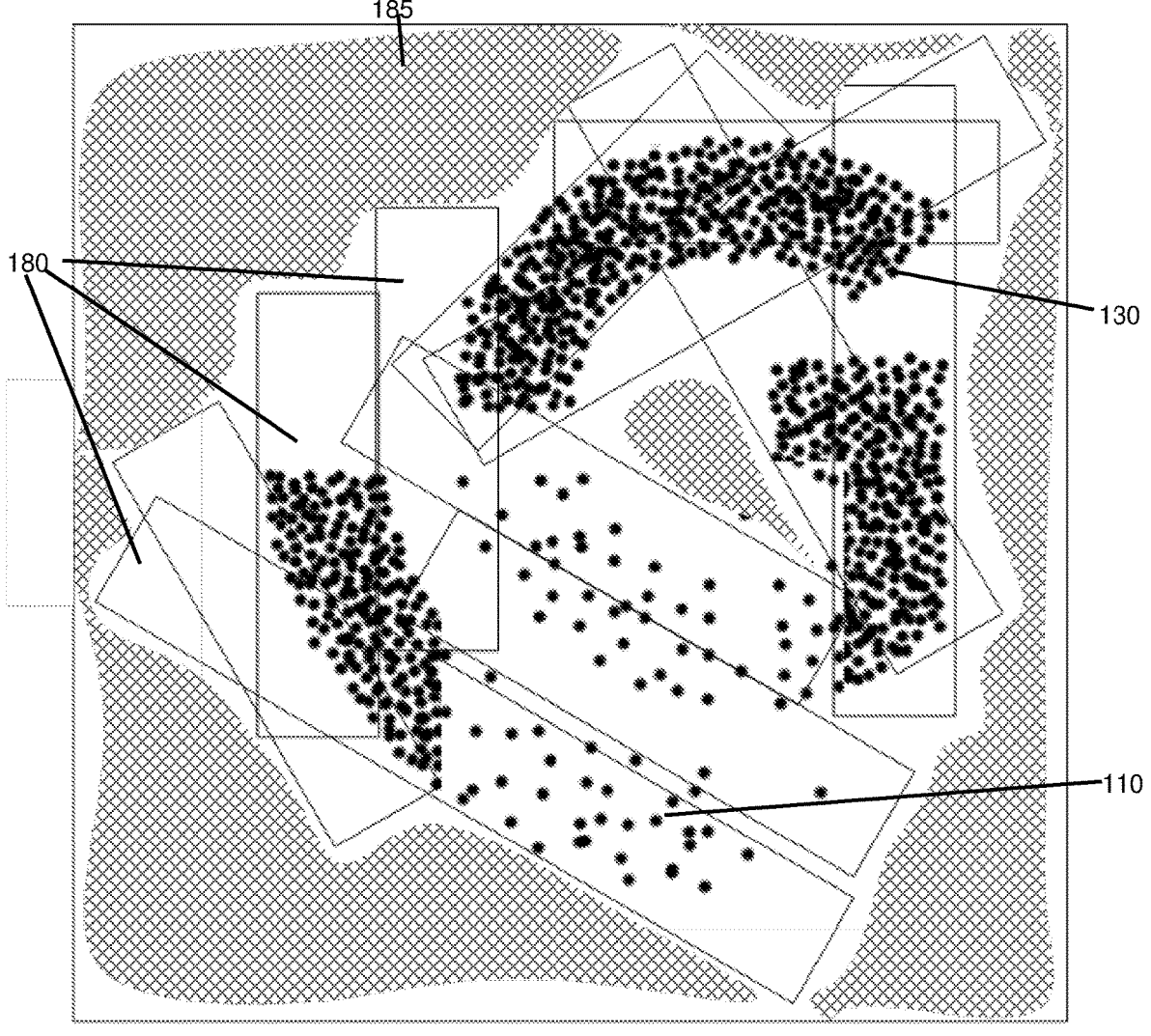
FIG. 11 shows an exemplary map generated by multiple GPR scans, in an embodiment of the disclosed technology.

FIG. 11 shows an exemplary map generated by multiple GPR scans, in an embodiment of the disclosed technology. The parts of the resultant known information 110 and 130 from FIG. 10 is shown here. High resolution data is known where there are more scans covering particular locations. Each path of travel 180 is shown in a respective rectangular box. For purposes of ease of understanding only the data at points shown in FIG. 10 is displayed here though each path of travel, in embodiments of the disclosed technology, would correspond to received data which is mapped to specific locations on and/or under the surface through which GPR transmissions were sent/received. As can be appreciated, where more than one path of travel is found at a particular location the resolution increases and pixelation decreases provided more accurate data for future use.

In embodiments, the GPR data received is generated by a GPR antenna or scanning device, such as a transducer, having a transceiver. The location data is separate positioning system data generated by, for example a global positioning system (GPS) device or apparatus.

In some embodiments, after every iteration the location data and the GPR data are received they are compared. If they correspond to each other above a pre-defined threshold value, then first resolution map is updated to a form a higher resolution at the locations where the location data and the GPR data correspond to each other. If they do not correspond, then the first resolution map is not updated, and the GPR data and location data is continuously compared after each iteration.

In some embodiments, the first resolution map is a series of determined electromagnetic propagation velocity values for each resolved position of a plurality of resolved positions within the first resolution map. In embodiments, the confidence level of an accuracy of the plurality of resolved positions increases with subsequent passes over each of the plurality of resolved positions. In other words, subsequent passes of a GPR antenna over a position that has been mapped and/or resolved will increase the resolution and confidence level of that resolved position. When the confidence level is above a pre-defined tolerance level, position data is based on received GPR transmissions and/or overall GPR data. In embodiments, the position data is given based on received GPR transmissions and/or overall GPR data without a separate positioning system.

In some embodiments, each iteration of receiving GPR data and/or location data is carried out by different devices. Each device includes one or more different GPR antennas. The GPR antennas may have different frequencies of measurement, different architecture, different antenna size, or different distance, angle, orientations or speed from a surface and/or subsurface. In certain embodiments, at least two of the sensor design characteristics and/or distances, angles, orientations or speeds from a surface and/or subsurface of the GPR antennas are different.

In embodiments, the different sensors, and therefore each of the different GPR antennas, travel in different directions relative to each one another, such that only some paths of the different sensors overlap. When the paths overlap, a previously stored portion of the first resolution map is required to be updated at the overlapping paths and/or the resolution of the previously stored portion of the first resolution map increases at the overlapping paths.

Figure 12:
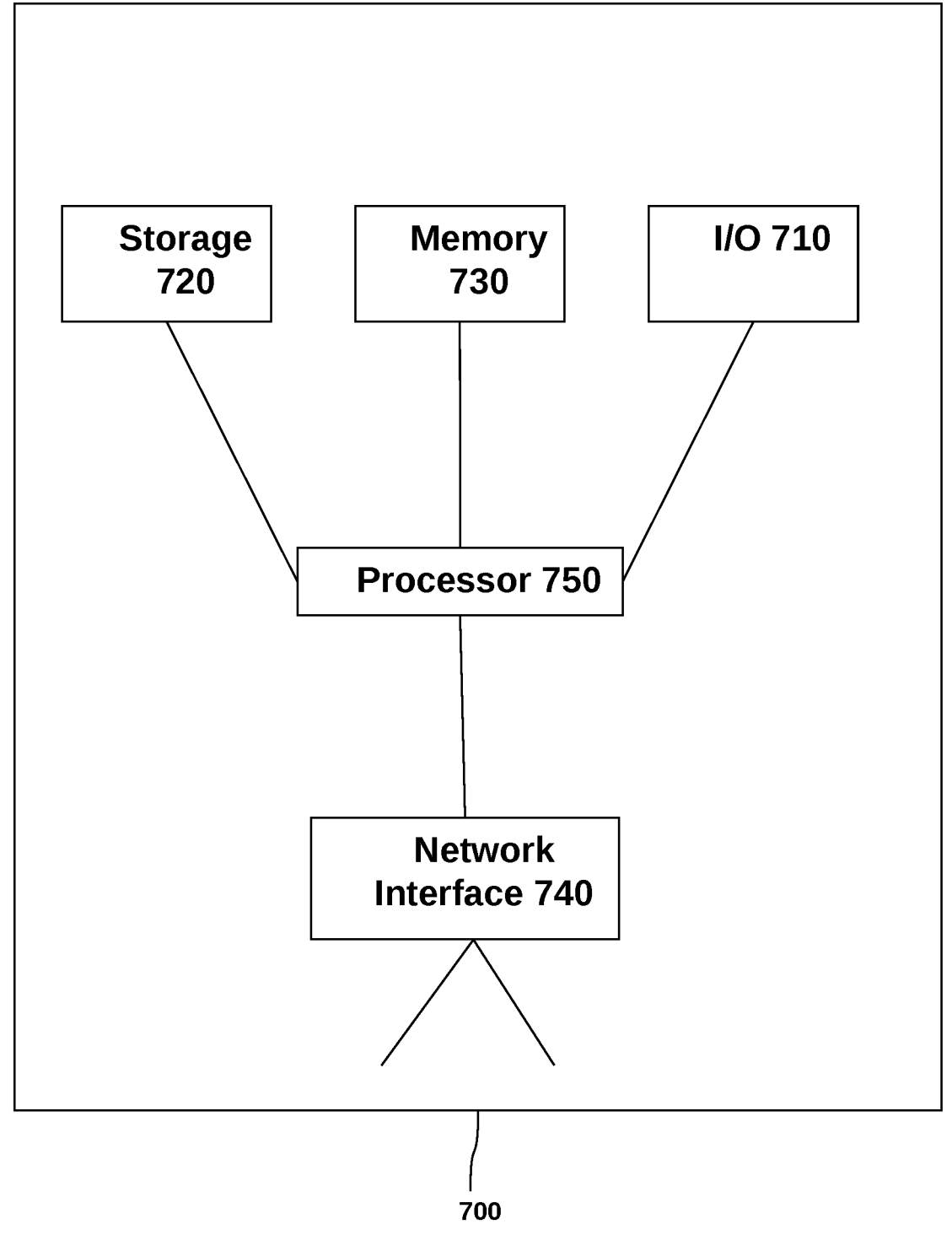
FIG. 12 shows a high-level block diagram of a device that may be used to carry out the disclosed technology.

FIG. 12 shows a high-level block diagram of a device that may be used to carry out the disclosed technology. Device 700 comprises a processor 750 that controls the overall operation of the computer by executing the measurement device's program instructions which define such operation. The measurement device's program instructions may be stored in a storage device 720 (e.g., magnetic disk, flash disk, database) and loaded into memory 730 when execution of the measurement device's program instructions is desired. Thus, the measurement device's operation will be defined by the measurement device's program instructions stored in memory 730 and/or storage 720, and the measurement device will be controlled by processor 750 executing the measurement device's program instructions. A device 700 also includes one or a plurality of input network interfaces for communicating with other devices via a network (e.g., the internet). A device 700 also includes one or more network interfaces 740 for communicating with other devices. Device 700 also includes input/output 710 representing devices which allow for user interaction with the device 700 (e.g., display, keyboard, mouse, speakers, buttons, etc.). One skilled in the art will recognize that an implementation of actual devices will contain other components as well, and that FIG. 12 is a high level representation of some of the components of such a measurement device for illustrative purposes. It should also be understood by one skilled in the art that the method and devices depicted in FIGS. 1 through 11 may be implemented on a device such as is shown in FIG. 12.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A method of generating a map based on ground penetrating radar (GPR) scans, comprising steps of:

a) receiving ground penetrating radar data corresponding to a path of travel of a device across a surface;

b) receiving location data corresponding to said path of travel of said device across said surface;

c) generating a first resolution map based on steps a) and b);

d) moving to a new location and returning to a previous location;

e) iteratively carrying out steps a), b), and d) and updating said first resolution map based on additional ground penetrating radar data and location data received after iteratively carrying out said steps a), b), and d);

wherein when said location data and said ground penetrating radar data correspond to each other above a pre-defined threshold value for different iterations of said carrying out said steps a) and b), said first resolution map is updated to a second higher resolution at locations where said location data and said ground penetrating radar data optimally correspond to each other.

2. The method of claim 1, wherein at least some of said location data received in step b) is from separate positioning system data.

3. The method of claim 2, wherein the separate positioning system data is unused for at least a portion of said travel from one location to another location due to said ground penetrating radar data being more accurate than said separate positioning system data.

4. The method of claim 1, wherein said paths of travel of each iteration of carrying out steps a) and b) is non-identical but overlapping at least in part, when updating to said second higher resolution.

5. The method of claim 4, wherein at least some of said paths of travel of each iteration of carrying out steps a) and b) are in different directions with respect to one another, such that said paths of travel are offset from one another; and said first resolution map is updated to a second higher resolution where said different direction of said paths of travel overlap.

6. The method of claim 1, wherein said first and subsequent resolution maps are a rendered and human viewable three-dimensional map of a surface and the features beneath said surface.

7. The method of claim 1, wherein said first and subsequent resolution maps are a series of dielectric values for each resolved position of a plurality of resolved positions within said first and subsequent resolution maps.

8. The method of claim 7, wherein a confidence level of accuracy of said plurality of resolved positions increases with each subsequent pass over each of said plurality of resolved positions; and upon said confidence level being above a pre-defined tolerance level, GPR data becomes the primary source for determining position.

9. The method of claim 8, wherein said positioning determination is given based on said received response to the exclusion of a positioning system.

10. The method of claim 1, wherein each iteration of carrying out steps a) and b) is carried out by a different device with a different ground penetrating radar antenna.

11. The method of claim 10, wherein each of said different ground penetrating radar devices may operate at different frequencies, have different architecture, size, weight, and/or scan from varying distances, angles, speeds or orientations from the surface.

12. The method of claim 10, wherein each of said different devices, and therefore each of said different ground penetrating radar antennas, further travels in a different direction than each previous said device such that only some paths of said different devices have overlapping paths; and wherein said overlapping paths are required to update a previously stored portion of said first resolution map and/or increase a resolution of said previously stored portion of said first resolution map.

13. The method of claim 1, wherein step d) includes resolving said first resolution map into a second and subsequently higher resolution when there is sufficient correspondence between a received response of a subsequent ground penetrating radar transmission of said additional ground penetrating radar data and location data and a previous received response for any said location data.

14. The method of claim 13, wherein at least some of said paths of travel of each iteration of carrying out steps a) and b) are in arbitrary directions relative to one another; and said first resolution map is updated to a second higher resolution where said arbitrary directions of said paths of travel overlap.

15. The method of claim 1, wherein said first resolution map is a series of determined electromagnetic propagation velocity values for each resolved position of a plurality of resolved positions within said first resolution map.

16. The method of claim 1, wherein each iteration of carrying out steps a) and b) causes a reduced pixelation of and an increased resolution of at least some of said first resolution map.

17. The method of claim 1, wherein step a) of receiving ground penetrating radar data corresponding to a path of travel of a device across a surface further comprises receiving ground penetrating radar data corresponding to a path of travel of a device across a surface according to a predetermined scanning pattern designed to systematically cover a geographic area.

18. A method of generating a map based on ground penetrating radar (GPR) scans, comprising steps of:
   a) receiving ground penetrating radar data corresponding to a path of travel of a device across a surface;
   b) receiving location data corresponding to said path of travel of said device across said surface;
   c) generating a first resolution map based on steps a) and b);
   d) iteratively carrying out steps a) and b) and updating said first resolution map based on additional ground penetrating radar data and location data received after iteratively carrying out said steps a) and b); wherein:
   when said location data and said ground penetrating radar data correspond to each other above a pre-defined threshold value for different iterations of said carrying out said steps a) and b), said first resolution map is updated to a second higher resolution at locations where said location data and said ground penetrating radar data optimally correspond to each other; and said paths of travel of each iteration of carrying out steps a) and b) is non-identical but overlapping at least in part, when updating to said second higher resolution.

19. A method of generating a map based on ground penetrating radar (GPR) scans, comprising steps of:
   a) receiving ground penetrating radar data corresponding to a path of travel of a device across a surface;
   b) receiving location data corresponding to said path of travel of said device across said surface;
   c) generating a first resolution map based on steps a) and b);
   d) moving to a new location and returning to a previous location;
   e) iteratively carrying out steps a), b), and d) and updating said first resolution map based on additional ground penetrating radar data and location data received after iteratively carrying out said steps a), b), and d), wherein after every iteration said location data and said ground penetrating radar data are compared and when said location data and said ground penetrating radar data correspond to each other above a pre-defined threshold value said first resolution map is updated to a higher resolution at locations where said location data and said ground penetrating radar data correspond to each other, and wherein a confidence level of accuracy of a plurality of resolved positions of said first resolution map increases with each subsequent pass over each of said plurality of resolved positions, and upon said confidence level being above a pre-defined tolerance level, GPR data becomes the primary source for determining position to the exclusion of said location data.

* * * * *